US012645579B2

(12) United States Patent
Zhang et al.

(10) Patent No.: US 12,645,579 B2
(45) Date of Patent: Jun. 2, 2026

(54) METHOD, DEVICE, AND COMPUTER PROGRAM PRODUCT FOR PERFORMING FILE SYSTEM CHECK

(71) Applicant: Dell Products L.P., Round Rock, TX (US)

(72) Inventors: Shuning Zhang, Beijing (CN); Lei Gao, Beijing (CN); Jian Liu, Beijing (CN); Huan Chen, Beijing (CN); Chen Gong, Beijing (CN); Jun Wang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/911,509

(22) Filed: Oct. 10, 2024

(65) Prior Publication Data

US 2025/0315373 A1     Oct. 9, 2025

(30) Foreign Application Priority Data

Apr. 3, 2024     (CN) .......................... 202410404802.2

(51) Int. Cl.
*G06F 12/02*          (2006.01)
(52) U.S. Cl.
CPC .................................. *G06F 12/023* (2013.01)
(58) Field of Classification Search
CPC ................................ G06F 12/02; G06F 12/023
See application file for complete search history.

(56) References Cited

U.S. PATENT DOCUMENTS

| | | | | |
|---|---|---|---|---|
| 7,010,655 B1 * | 3/2006 | Harmer | ................. | G06F 12/023 |
| | | | | 711/E12.019 |
| 7,035,990 B1 * | 4/2006 | Muhlbauer | ........... | G06F 9/5016 |
| | | | | 711/170 |

(Continued)

FOREIGN PATENT DOCUMENTS

| | | | | | |
|---|---|---|---|---|---|
| WO | WO-2021087662 A1 * | 5/2021 | ............. | G06F 12/02 |
| WO | WO-2022227997 A1 * | 11/2022 | ............. | G06F 9/445 |

OTHER PUBLICATIONS

D. W. Mutschler, "Enhancement of Memory Pools Toward a Multi-Threaded Implementation of the Joint Integrated Mission Model (JIMM)," Proceedings of the 2006 Winter Simulation Conference, Monterey, CA, USA, 2006, pp. 856-862.*

(Continued)

*Primary Examiner* — Pierre Michel Bataille
(74) *Attorney, Agent, or Firm* — BainwoodHuang

(57)          ABSTRACT

Techniques are directed to performing a file system check. Such technique involve determining a plurality of unreleased memory pools for a plurality of phases of a file system check by parsing a resource file indicative of an allocation situation of a memory. Such technique further involve determining a list of phases based on the plurality of unreleased memory pools. Such technique further involve performing the file system check based on the list of phases. Accordingly, it is possible to pre-determine an unreleased memory pool based on a resource file and perform a file system check according to the information of the memory pool, which avoids the problems of memory fragmentation and consecutive out-of-memory caused by the unreleased memory pool, thereby solving the out-of-memory error during the execution of the file system check.

16 Claims, 8 Drawing Sheets

(56)                References Cited

U.S. PATENT DOCUMENTS

| | | | |
|---|---|---|---|
| 7,631,009 B1 | 12/2009 | Patel et al. | |
| 7,631,155 B1 | 12/2009 | Bono et al. | |
| 7,694,191 B1 | 4/2010 | Bono et al. | |
| 7,818,535 B1 | 10/2010 | Bono et al. | |
| 8,037,345 B1 | 10/2011 | Iyer et al. | |
| 8,285,758 B1 | 10/2012 | Bono et al. | |
| 8,442,952 B1 | 5/2013 | Armangau et al. | |
| 9,535,606 B2* | 1/2017 | Krithivas | G06F 12/0692 |
| 9,983,914 B2* | 5/2018 | Plonka | G06F 11/3466 |
| 10,628,296 B1* | 4/2020 | Risinger | G06F 9/5016 |
| 10,996,869 B1 | 5/2021 | Tamilarasan et al. | |
| 2002/0112008 A1 | 8/2002 | Christenson et al. | |
| 2004/0060041 A1* | 3/2004 | Demsey | G06F 9/45516 |
| | | | 711/E12.009 |
| 2007/0233989 A1* | 10/2007 | Garcia-Arellano | ......................... |
| | | | G06F 12/0646 |
| | | | 711/170 |
| 2012/0036239 A1* | 2/2012 | Donaghey | H04L 41/0886 |
| | | | 709/221 |
| 2014/0372726 A1* | 12/2014 | Koo | G06F 12/10 |
| | | | 711/206 |
| 2016/0335021 A1* | 11/2016 | Plonka | G06F 11/3037 |
| 2017/0300262 A1* | 10/2017 | Chen | G06F 3/0604 |
| 2020/0042399 A1 | 2/2020 | Kuang et al. | |
| 2020/0042616 A1 | 2/2020 | Kuang et al. | |
| 2020/0042617 A1 | 2/2020 | Kuang et al. | |
| 2020/0250040 A1 | 8/2020 | Vankamamidi et al. | |
| 2020/0252289 A1* | 8/2020 | Nelson | H04L 41/16 |
| 2021/0149731 A1* | 5/2021 | Shorb | G06F 9/5016 |
| 2021/0342215 A1 | 11/2021 | Chawla et al. | |
| 2021/0342273 A1 | 11/2021 | Patel et al. | |
| 2021/0406241 A1 | 12/2021 | Patel et al. | |
| 2022/0027059 A1 | 1/2022 | Chen et al. | |
| 2023/0118349 A1 | 4/2023 | Mathews et al. | |

OTHER PUBLICATIONS

J. Wahlgren, M. Gokhale and I. B. Peng, "Evaluating Emerging CXL-enabled Memory Pooling for HPC Systems, " 2022 IEEE/ACM Workshop on Memory Centric High Performance Computing (MCHPC), Dallas, TX, USA, 2022, pp. 11-20.*

* cited by examiner

200

202

Determining a plurality of unreleased memory pools for a plurality of phases of a file system check by parsing a resource file indicative of an allocation situation of a memory

204

Determining a list of phases based on the plurality of unreleased memory pools

206

Performing the file system check based on the list of phases

400A

402

Mapper phase I

404

Mapper phase II

406

Mapper phase III

408

Mapper phase IV

410

System area recovery phase

412

Namespace recovery phase

400B 450   452   454   456   458   460   462

500

METHOD, DEVICE, AND COMPUTER PROGRAM PRODUCT FOR PERFORMING FILE SYSTEM CHECK

CROSS-REFERENCE TO RELATED APPLICATION

This application claims priority to Chinese Patent Application No. CN202410404802.2, on file at the China National Intellectual Property Administration (CNIPA), having a filing date of Apr. 3, 2024, and having "METHOD, DEVICE AND COMPUTER PROGRAM PRODUCT FOR PERFORMING FILE SYSTEM CHECKS" as a title, the contents and teachings of which are herein incorporated by reference in their entirety.

TECHNICAL FIELD

Embodiments of the present disclosure relate to the field of computers and, more particularly, to a method, a device, and a computer program product for performing a file system check.

BACKGROUND

A file system check is used to check a file system of an operating system for errors or unresolved problems, and can fix potential errors and generate a report. The file system check includes multiple phases to perform file structure scanning, a consistency check, error detection, among others, and finally generates a check report.

The file system check is a critical step in maintaining the health of the computer system. It not only helps to ensure the normal operation, data integrity, and security of the system, but also prevents potential problems and resolves the existing hidden dangers in a timely manner, thus ensuring a stable and reliable system. Performing a file system check on a regular basis can effectively prevent the accumulation of potential problems and provide a guarantee for the long-term stable operation of the system.

SUMMARY OF THE INVENTION

Embodiments of the present disclosure provide a method, a device, and a computer program product for performing a file system check.

In one aspect of the present disclosure, a method for performing a file system check is provided. The method includes determining a plurality of unreleased memory pools for a plurality of phases of a file system check by parsing a resource file indicative of an allocation situation of a memory. The method further includes determining a list of phases based on the plurality of unreleased memory pools. In addition, the method further includes performing the file system check based on the list of phases.

In another aspect of the present disclosure, an electronic device is provided. The device includes a processing unit and a memory, where the memory is coupled to the processing unit and has instructions stored therein. The instructions, when executed by the processing unit, perform the following actions: determining a plurality of unreleased memory pools for a plurality of phases of a file system check by parsing a resource file indicative of an allocation situation of a memory; determining a list of phases based on the plurality of unreleased memory pools; and performing the file system check based on the list of phases.

In still another aspect of the present disclosure, a computer program product is provided. The computer program product is tangibly stored in a non-transitory computer-readable medium and contains computer-executable instructions. The computer-executable instructions, when executed, cause a computer to perform a method or process according to the embodiments of the present disclosure.

The Summary of the Invention section is provided to introduce a selection of concepts in a simplified form, which will be further described in the Detailed Description below. The section of Summary of the Invention is neither intended to identify key features or essential features of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objects, features, and advantages of the present disclosure will become more apparent. In the example embodiments of the present disclosure, the same reference numerals generally represent the same elements.

DETAILED DESCRIPTION

Figure 1:
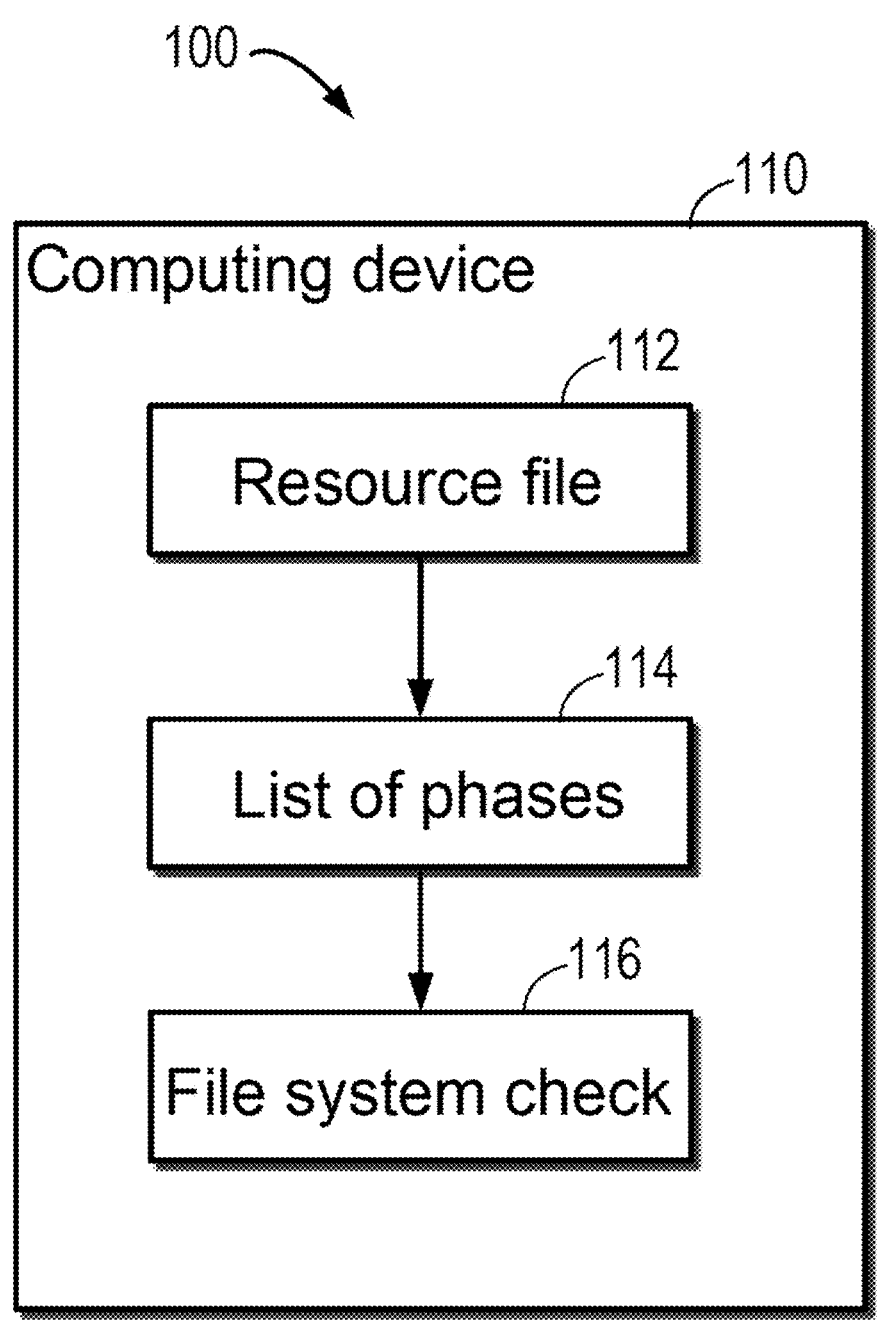
FIG. 1 illustrates a schematic diagram of an example environment of a storage system according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in further detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects, unless specifically indicated as referring to different objects.

There is typically a file system check function provided on an operating system, where the file system check includes multiple phases, and each phase needs to be completed in order to complete the overall process of the file system check. The file system check is used to check a file system of the operating system for errors or unresolved problems, and if errors or unresolved problem are found in the check, the file system check can fix potential errors and generate a report. However, out-of-memory (OOM) errors often occur when the file system check is being performed, which results in the file system check not being performed properly and greatly affects the user experience. Moreover, an OOM error at any phase will cause the file system check to fail.

There are many causes for the occurrence of OOM and after analysis, it was found that the existence of an unreleased memory pool at the end of each phase leads to memory fragmentation in the memory, and in the case of consecutive out-of-memory, an OOM error is caused. To this end, embodiments of the present disclosure propose a method for performing a file system check. The method pre-determines, from a resource file, whether there is an unreleased memory pool in each phase of the file system check, then determines a list of phases, the list of phases including the unreleased memory pool in each phase, and finally performs the file system check according to the list of phases.

Thus, embodiments of the present disclosure can pre-determine an unreleased memory pool based on a resource file and perform a file system check according to the information of the memory pool, which avoids the problems of memory fragmentation and consecutive out-of-memory caused by the unreleased memory pool, thereby solving the OOM error during the execution of the file system check. In addition, when facing an OOM error in a file system check, a user can fix the OOM error from the resource file without more complicated modifications or seeking professional help, which can greatly facilitate the use by the user.

The basic principles and several example implementations of the present disclosure are described below with reference to FIG. 1 to FIG. 8. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of example environment 100 in which a device and/or a method according to an embodiment of the present disclosure may be implemented. As shown in FIG. 1, the example environment 100 may include a computing device 110, which may be a user terminal, a mobile device, a computer, or the like, and may also be a computing system, a single server, a distributed server, or a cloud-based server. The computing device 110 may perform a file system check 116, which functions for checking a file system of an operating system for errors or unresolved problems, and can fix potential errors and generate a report. For example, if the system has had a sudden power failure or disk abnormality, the file system can be checked and fixed to prevent data loss.

The computing device 110 can acquire and parse a resource file 112 to determine a plurality of unreleased memory pools for a plurality of phases of the file system check 116. For example, the resource file 112 may record the unreleased memory pool for each phase. After the parsing is complete, a list of phases 114 may be generated. The list of phases 114 may include the unreleased memory pool for each phase in the file system check 116. In addition, the computing device may perform the file system check 116 using the list of phases 114.

It should be understood that description of the architecture and function in the example environment 100 is made for illustrative purposes only and does not imply any limitation to the scope of the present disclosure. The embodiments of the present disclosure may also be applied to other environments having different structures and/or functions.

Figure 2:
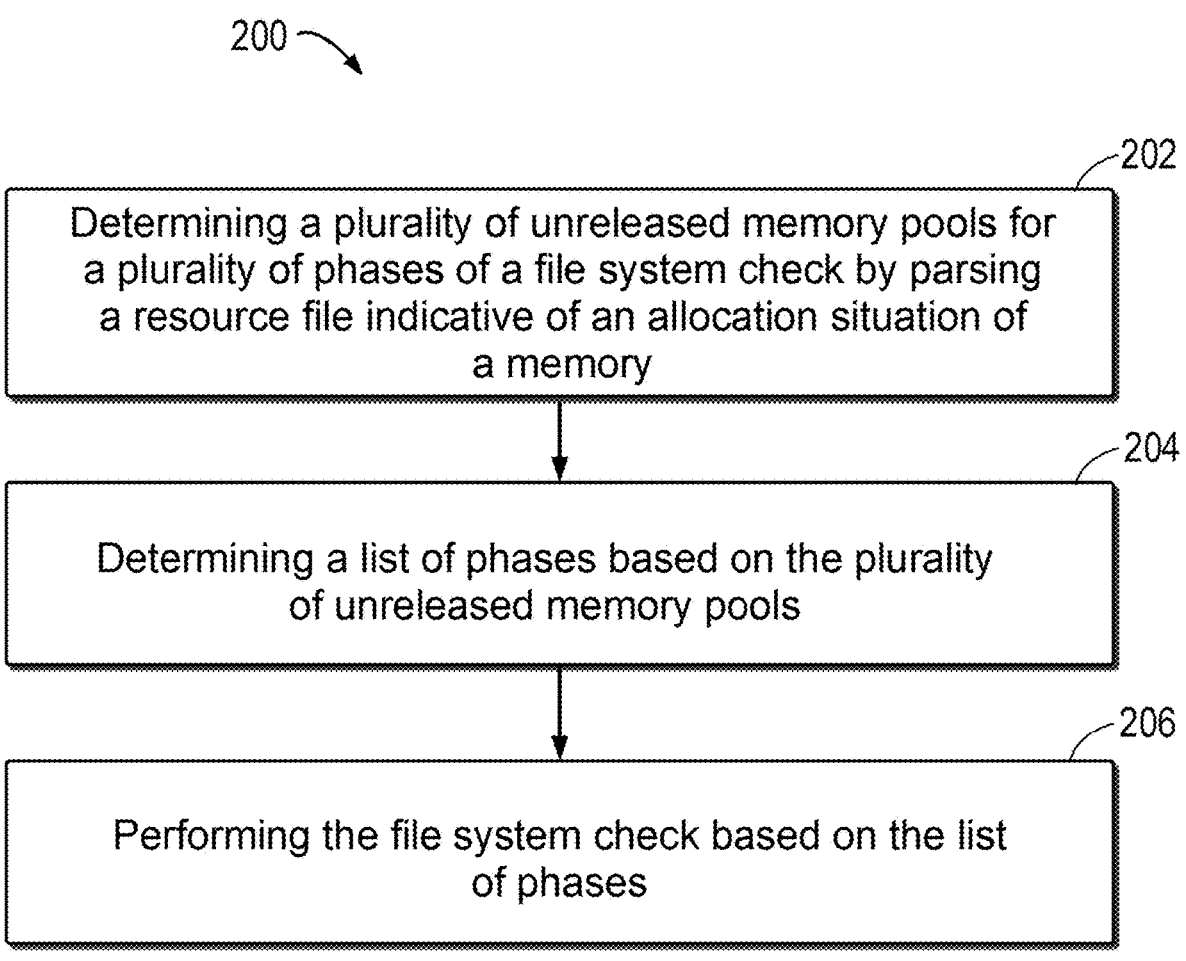
FIG. 2 illustrates a flowchart for performing a file system check according to an embodiment of the present disclosure.

FIG. 2 illustrates a flowchart for performing a file system check 200 according to an embodiment of the present disclosure. At block 202, a plurality of unreleased memory pools for a plurality of phases of a file system check may be determined by parsing a resource file indicative of an allocation situation of a memory. For example, referring to FIG. 1, the computing device 110 may parse the resource file 112 to determine a plurality of unreleased memory pools for a plurality of phases of the file system check.

At block 204, a list of phases may be determined based on the plurality of unreleased memory pools. For example, referring to FIG. 1, the computing device 110 may determine a list of phases 114 based on the plurality of unreleased memory pools. At block 206, the file system check may be performed based on the list of phases. For example, referring to FIG. 1, the computing device 110 may perform the file system check 116 based on the list of phases 114.

Thus, according to the method 200 of embodiments of the present disclosure, it is possible to pre-determine an unreleased memory pool based on a resource file and perform a file system check according to the information of the memory pool, which avoids the problems of memory fragmentation and consecutive out-of-memory caused by the unreleased memory pool, thereby solving the OOM error during the execution of the file system check. In addition, when facing an OOM error in a file system check, a user can fix the OOM error from the resource file without more complicated modifications or seeking professional help, which can greatly facilitate the use by the user.

Figure 3:
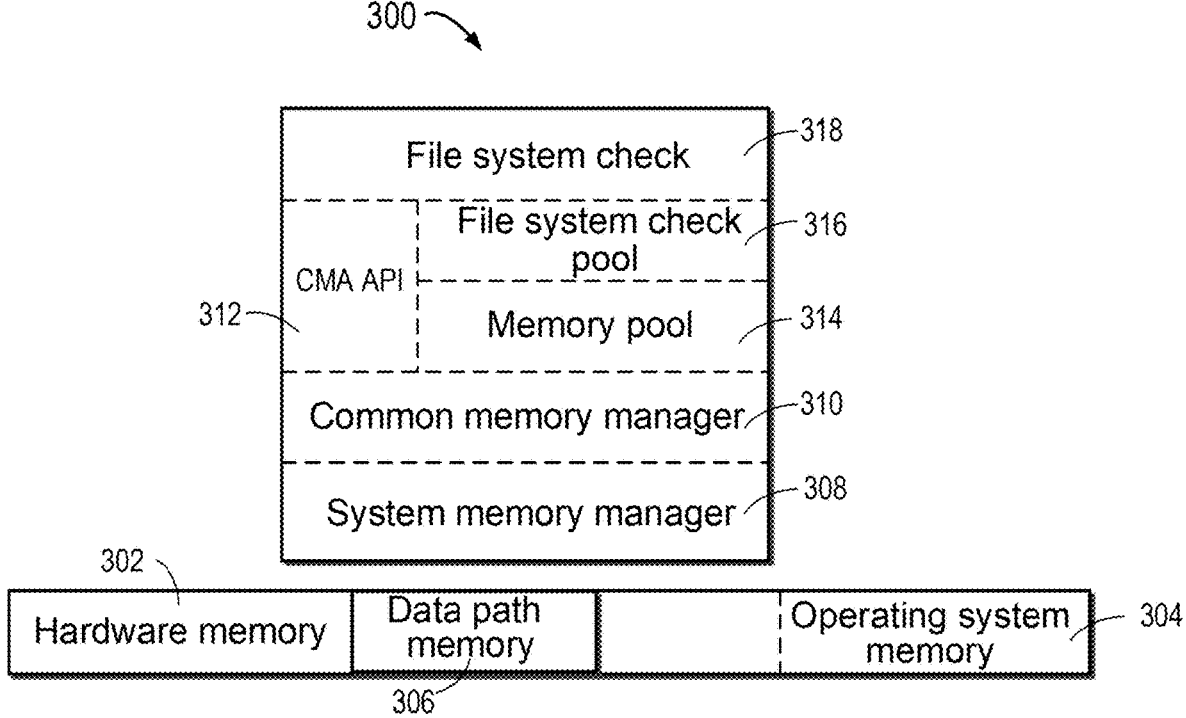
FIG. 3 illustrates a schematic diagram of memory management in an operating system according to an embodiment of the present disclosure.

FIG. 3 illustrates a schematic diagram of memory management 300 in an operating system according to an embodiment of the present disclosure. As shown in FIG. 3, a physical memory may include hardware memory 302 and operating system memory 304, where the hardware memory 302 may include data path (DP) memory 306. The DP memory 306 may be used to map the hardware memory 302 into a process virtual memory when performing a file system check 318, and the start address may be 0x500000000000, for example. The size of the DP memory 306 is associated with the platform. The DP memory 306 can be managed through a common memory manager (CMA) 310, where the CMA 310 is a packaged implementation of a system memory manager 308. The DP memory 306 is contiguous virtual memory and is managed by the CMA 310. Memory of different granularities can be allocated through the CMA 310.

As shown in FIG. 3, the file system check 318 can use the CMA application programming interface (CMA API) 312 to manage memory allocation. In addition, the file system check 318 can use a file system check pool 316 to manage the memory allocation. For example, the memory pool 314 may be allocated through the CMA 310, and then the file system check pool 316 may be allocated through the memory pool 314.

Figure 4A:
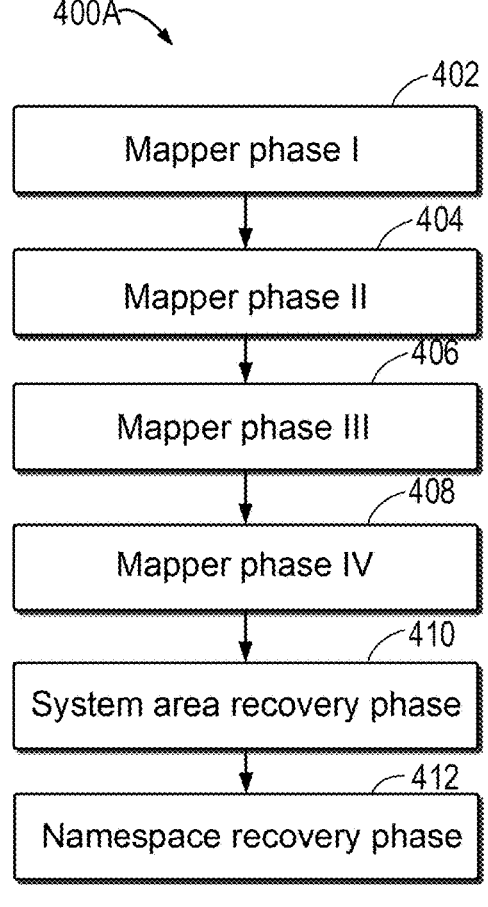
FIG. 4A illustrates a schematic diagram of a process for performing a file system check according to an embodiment of the present disclosure.

FIG. 4A illustrates a schematic diagram of a process 400A for performing a file system check according to an embodiment of the present disclosure. As previously described, a file system check may include a plurality of phases, each of which performs different preparation, check, and repair work. It should be understood that the file system check can include different numbers of phases on different operating systems and platforms, and that the specific operations performed at each phase can be different. As shown in FIG. 4, at block 402, a mapper phase I may be performed. At this phase, operations related to file system mapping may be performed, for example, scanning the file system structure and constructing an internal mapping table as well as checking data blocks or index nodes in the file system. At block 404, a mapper phase II may be performed. The mapper phase II is an intermediate phase between the mapper phase I and a mapper phase III, and performs some additional mapping operations or preparation work. For example, for a large file system, additional mapping steps or data preparation operations may be required.

At block 406, the mapper phase III may be performed. At this phase, deeper mapping and processing operations may be performed, for example, further processing data blocks and index nodes in the file system, or performing more complex data structure rebuilding or fixing operations. At block 408, a mapper phase IV may be performed. At this phase, the final mapping and processing operations may be performed, for example, completing the construction and fixing of the file system structure, performing final data consistency checking and fixing, and so forth.

At block 410, a system area (SA) recovery phase may be performed. At this phase, operations related to SA recovery may be performed, for example, recovering critical system areas (e.g., superblocks) of the file system, and rebuilding or fixing metadata structures of the file system, among others. At block 412, a namespace recovery phase may be performed. At this phase, operations related to namespace recovery may be performed, for example, recovering the directory structure and the file namespace in the file system, as well as performing consistency checking and fixing of the namespace of the file system, and the like.

Figure 4B:
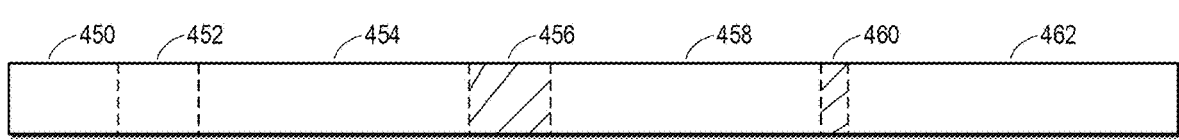
FIG. 4B illustrates a schematic diagram of data path (DP) memory according to an embodiment of the present disclosure.

FIG. 4B illustrates a schematic diagram of DP memory 400B according to an embodiment of the present disclosure. The DP memory 400B may correspond to a DP memory allocation situation at the end of a certain phase (e.g., the mapper phase III). As shown in FIG. 4, there are memory pools 450 to 462 on the DP memory, where the memory pool 450, the memory pool 452, the memory pool 454, the memory pool 458, and the memory pool 462 are released memory pools, and the memory pool 456 and the memory pool 460 are unreleased memory pools. At the beginning of the next phase (e.g., the mapper phase IV), it is also necessary to utilize the DP memory, but because of the memory pool 456 and the memory pool 462, there exist memory fragments and consecutive out-of-memory in the DP memory, and then an OOM error may be caused.

Figure 5:
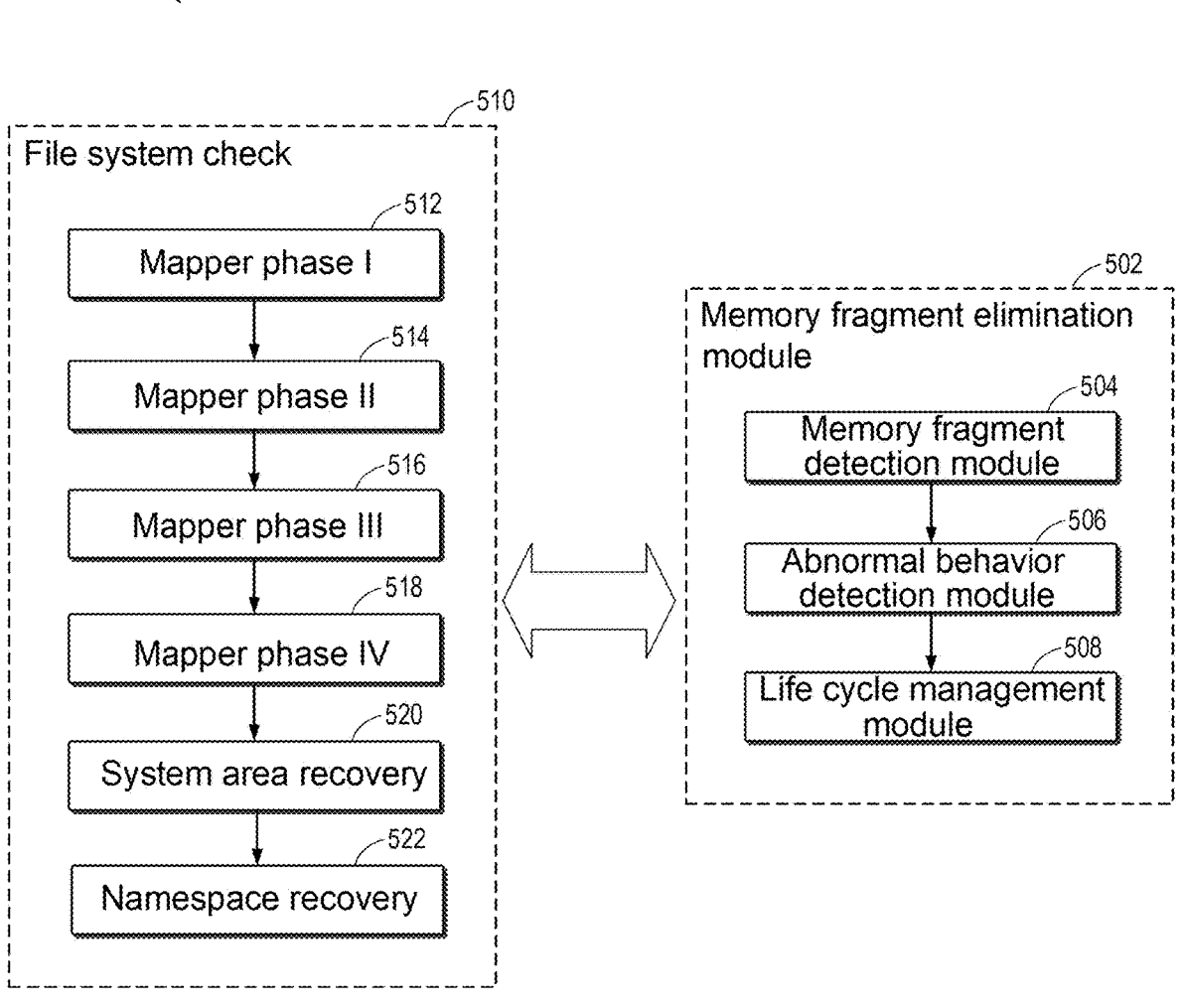
FIG. 5 illustrates a schematic diagram of a process for performing a file system check according to an embodiment of the present disclosure.

FIG. 5 illustrates a schematic diagram of a process 500 for performing a file system check according to an embodiment of the present disclosure. In some embodiments, a memory fragment elimination (MFE) module 502 may be utilized to manage the process of a file system check 510. As shown in FIG. 5, the MFE module 502 includes three sub-modules, a memory fragment detection (MFD) module 504, an abnormal behavior detection (ABD) module 506, and a life cycle management (LCM) module 508.

The process of the file system check 510 may involve a mapper phase I 512, a mapper phase I 514, a mapper phase I 516, a mapper phase I 518, an SA recovery phase 520, and a namespace recovery phase 522. In addition, it should be understood that embodiments of the present disclosure illustrate example phases in the file system check, and that on different operating systems or platforms, different execution phases may be involved. At any of these phases, the MFE module 502 may be used for management. For example, the MFD module 504 may detect memory fragmentation problems, and it can scan the entire DP memory and check whether there are some unreleased memory blocks that divide the DP into separate parts, which means that memory fragmentation has occurred.

The ABD module 506 can detect an abnormal behavior of the memory pool. Since there is no hard limit on the budget of the memory pool when performing a file system check, if the memory pool is exhausted, it will turn to allocating memory from the global pool or the CMA, and this situation may lead to the occurrence of memory fragments which, in turn, may lead to the occurrence of OOM errors. In addition to the memory pool being exhausted, there are other abnormal behaviors that can cause the pool to allocate memory from the CMA, for example, incorrectly defined object sizes. Therefore, these behaviors are defined as abnormal behaviors and warning information may be sent if an abnormal behavior is detected. In some embodiments, to detect these abnormal behaviors, a counter may be added to the ABD module 506, and if an abnormal behavior is checked, the counter may be updated. In addition, a plurality of counters can be added in the ABD module 506, each counter corresponding to a different abnormal behavior. At the end of the file system check, the counters may be checked to check for some abnormal behaviors. In some embodiments, a count threshold may be used to determine the severity of an abnormal behavior and determine whether to send the warning information. In some embodiments, a plurality of rules may be used to have count values of the plurality of counters to determine the severity of the abnormal behaviors and to determine whether to send the warning information. In addition, the MFE module 502 further includes the LCM module 508 that can automatically adjust the life cycles of the memory pools, and by adjusting the life cycles of the memory pools, the memory pool layout can be rearranged to eliminate memory fragments. Furthermore, in addition to the various sub-modules, the MFE module 502 may include many APIs and these APIs will be called in performing a file system check. For example, if a memory pool is created, a Memory Pool Add API is called. At the beginning of each phase, the Memory Pool Add API can be called. A Memory Pool Release API and a Phase Switch API can be called when each phase is about to complete.

Figure 6:
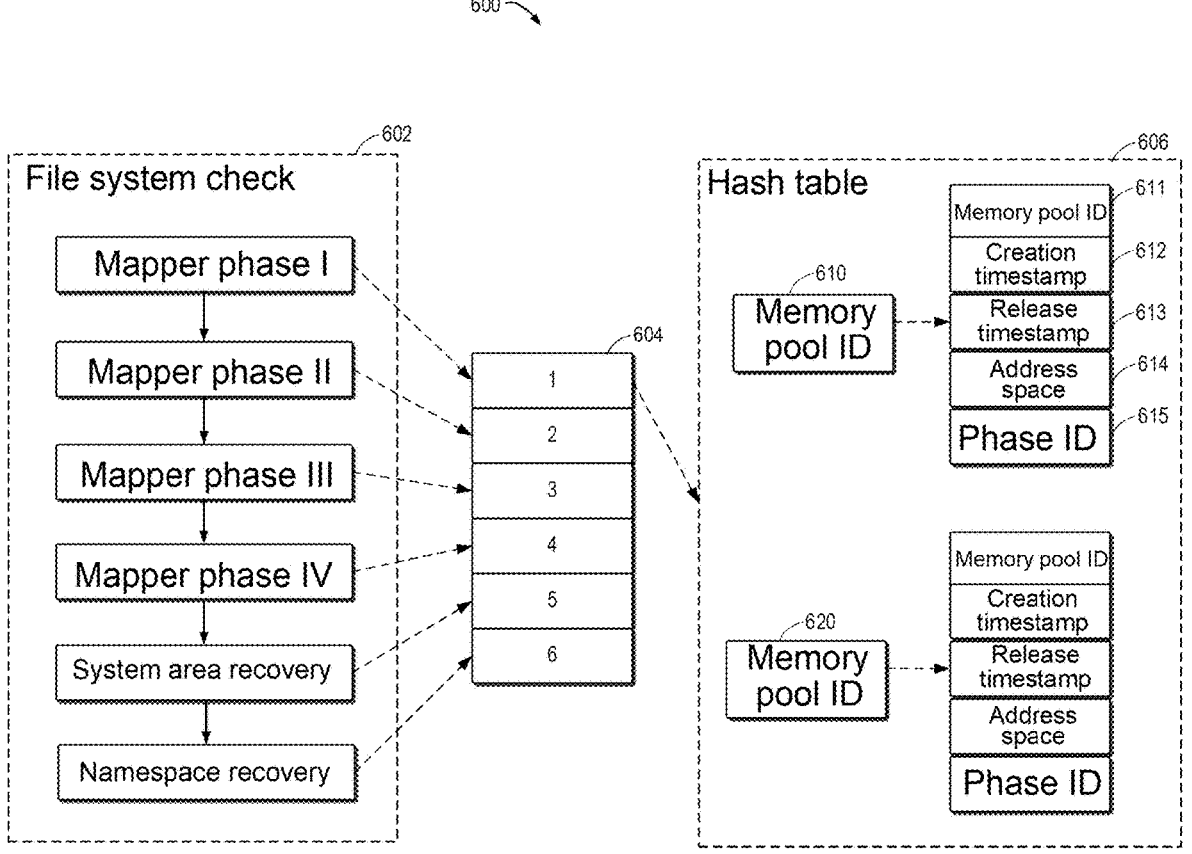
FIG. 6 illustrates a schematic diagram of a process for using a hash table of a memory pool when performing a file system check according to an embodiment of the present disclosure.

FIG. 6 illustrates a schematic diagram of a process 600 for using a hash table of a memory pool when performing a file system check according to an embodiment of the present disclosure. In conjunction with FIG. 5, the hash table is generated by the MFE module 502 in the MFE module 502. As shown in FIG. 6, each phase in the file system check 602 corresponds to an array 604. For example, the first phase may include the hash table 604. The hash table 610 may include a memory pool ID 610 and a memory pool ID 620 as keys in the hash table 610. It should be understood that while two keys are illustrated herein as an example, the hash table can include fewer or more keys. The information corresponding to the memory pool ID 610 may include a memory pool ID 611, a creation timestamp 612, a release timestamp 613, an address space 614, and a phase ID 614. For example, when memory pool ID 610 is not destroyed in the current phase, its release timestamp 613 should be empty or some other specified values. The start address and the end address of the memory pool ID 610 are recorded in the address space 614.

In some embodiments, the following rule can be set when adding a memory pool to the hash table: when a memory pool is created during a file system check, items will be added to the hash table and corresponding information will be populated. For example, when the memory pool ID 610 is created in the first phase of performing the file system check 602, the memory pool ID 610 will be added to the hash table 604 and the corresponding information will be populated. Additionally or alternatively, the following rule may be set when a memory pool is added to the hash table: if the memory pool was not destroyed at a previous phase, it will be added to the hash table at the current phase. For example, when the second phase of the file system check 602 is performed, if the memory pool ID 610 is not released, then the memory pool ID 610 and its corresponding information should be populated in the hash table corresponding to the second phase. In some embodiments, the following rule may be set when a memory pool is removed from the hash table: if the memory pool is destroyed in the current phase and the space is again used by another pool, it will be removed. For example, if the memory pool ID 610 is destroyed in the current phase and the space is again used by another pool, it will be removed. In addition, the information about the memory pool in the hash table may also be modified, for example, if the memory pool is destroyed in the current phase, the release timestamp will be updated.

Based on the information in the hash table, the memory pools can be scanned one by one and ranked based on address, and if there is memory space in two unreleased memory pools, a memory fragmentation problem can be confirmed. In addition, the array 606 and its corresponding hash table can be dumped to a resource file (e.g., a local file). The LCM module can adjust the order of the memory pools to eliminate the memory fragmentation problem. In addition, the memory layout can be drawn in a picture so that a user or developer can manually view the layout.

Figure 7:
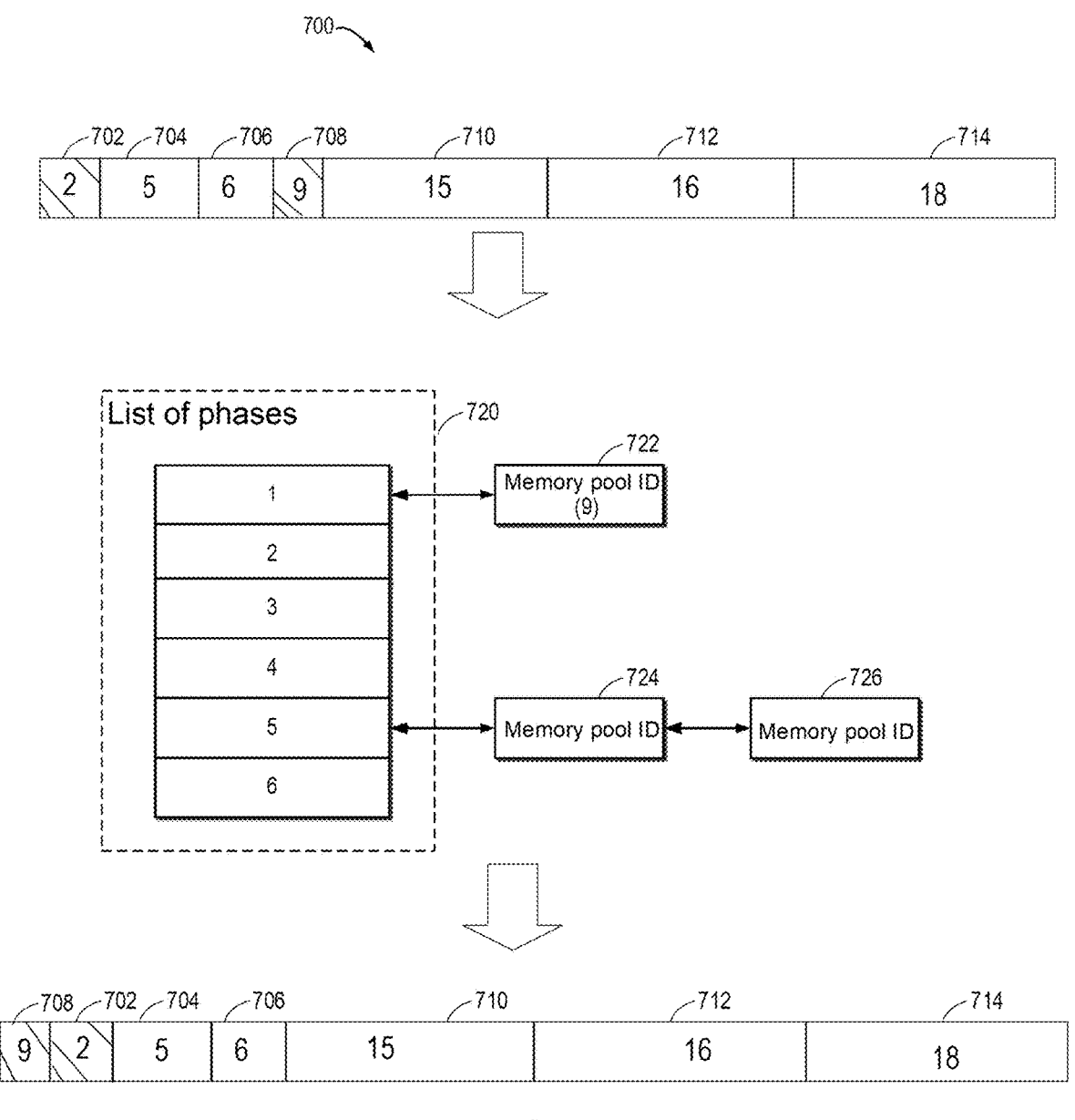
FIG. 7 illustrates a schematic diagram of a process for creating a list of phases according to an embodiment of the present disclosure.

FIG. 7 illustrates a schematic diagram of a process 700 for creating a list of phases according to an embodiment of the present disclosure. In conjunction with FIG. 5, the process 700 may be performed by the LCM module 508. This LCM module is the key point for eliminating memory fragmentation, and all memory pools will be registered to this LCM module. If the MFD module detects a memory fragmentation problem, the module will create corresponding memory pools with a new order. When the file system check is restarted due to an OOM problem, a Life Cycle Initialize API will be called, which will read and parse the resource file in the JSON (JavaScript Object Notation) format recorded by the MFD module. An example of the resource file is as follows:

```
{
    "memory_layout": [
        {
            "fsck_phase": 1,
            "has_fragment": false,
            "pools": [
                {
                    "id": 1,
                    "start_timestamp": 11111,
                    "destroy_timestamp": 111112,
                    "start_address": 50000000,
                    "end_address": 50000100,
                    "phase_id": 1
                },
                {
                    "id": 3,
                    "start_timestamp": 11111,
                    "destroy_timestamp": 111112,
                    "start_address": 50000200,
                    "end_address": 50000400,
                    "phase_id": 1
                }
            ]}
```

When the LCM module parses the resource file, it first checks the field "has_fragment," which indicates whether there are any memory fragments in the phase, and if the field is true, it will parse the layout and search for the location of the unreleased memory pool. As shown in FIG. 7, the LCM module may determine by parsing that the memory pool 702 (corresponding to an ID of 2) and the memory pool 708 (corresponding to an ID of 9) are unreleased memory pools, and that the memory pool 704, the memory pool 706, the memory pool 710, the memory pool 712, and the memory pool 714 have been released. Only the memory layout of one phase is shown here, and the LCM may also parse the memory layout of other phases.

As shown in FIG. 7, memory fragmentation can be found between the memory pool 702 and the memory pool 708, in which case the "has_fragment" field should be true. If the LCM module finds "has_fragment" to be true, it scans the list of memory pools for the resource file and determines the memory pool that causes memory fragmentation. For example, it may be found that the memory pool 708 is not released and that the memory pool 704 and the memory pool 706 are released, and thus the memory pool 708 results in memory fragmentation in the memory. After parsing, the LCM module may generate a list of phases 720. For example, a memory pool ID (9) 722 may be recorded in the list of phases 710 to indicate that the memory pool 9 was not released at the end of the first phase, resulting in memory fragmentation. Additionally, a memory pool ID 724 and a memory pool ID 726 may be recorded to indicate that at the end of the fifth phase, the memory pool ID 724 and the memory pool ID 726 were not released, resulting in memory fragmentation.

When the file system check is performed, memory allocation can be performed based on the list of phases 720. For example, when the first phase is performed, a Memory Pool Create API can be called to prioritize the creation of the memory pool 9. In this way, even if the memory pool 9 is not released at the end of the first phase, it will not result in the occurrence of memory fragmentation because it is at the start of the memory.

Figure 8:
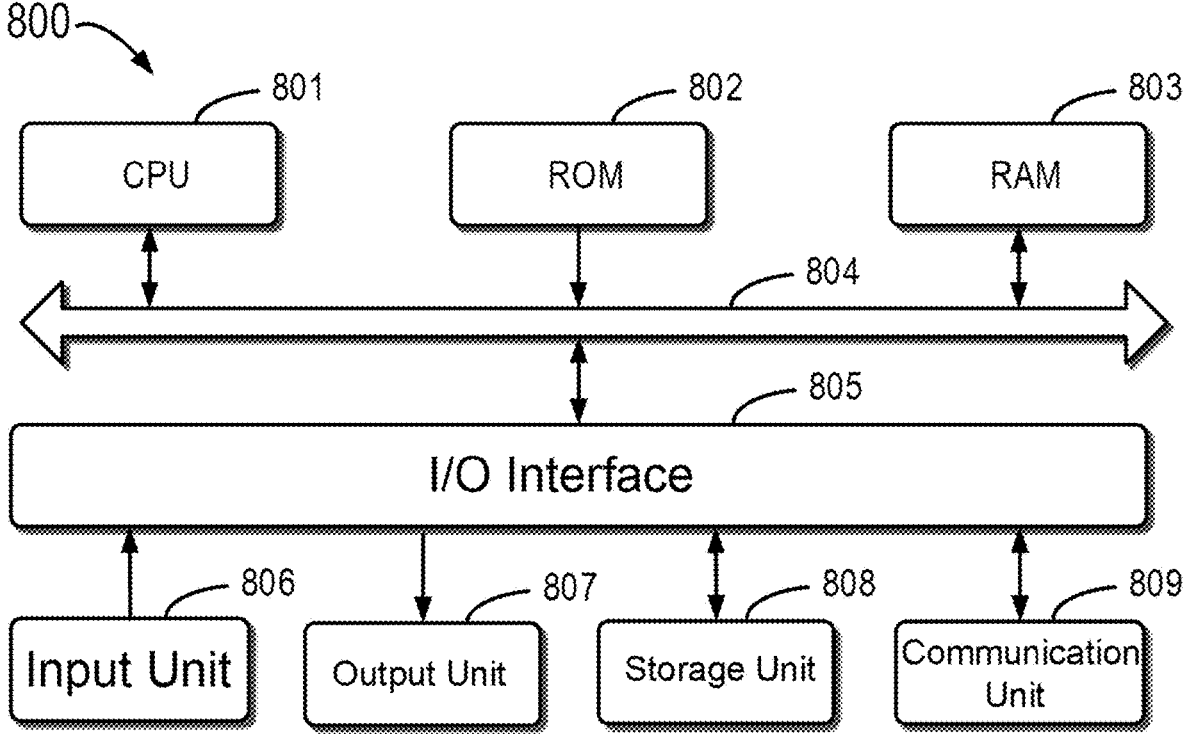
FIG. 8 illustrates a schematic block diagram of a device that may be configured to implement embodiments of the present disclosure.

FIG. 8 illustrates a schematic block diagram of a device 800 that can be used to implement embodiments of the present disclosure. The device 800 may be the device or apparatus described in embodiments of the present disclosure. As shown in FIG. 8, the device 800 includes a Central Processing Unit (CPU) 801, which may execute various appropriate actions and processing in accordance with computer program instructions stored in a Read-Only Memory (ROM) 802 or computer program instructions loaded onto a Random Access Memory (RAM) 803 from a storage unit 808. Various programs and data required for the operation of the device 800 may also be stored in the RAM 803. The CPU 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard and a mouse; an output unit 807, such as various types of displays and speakers; the storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various methods or processes described above may be performed by the processing unit 801. For example, in some embodiments, the method may be embodied as a computer software program that is tangibly included in a machine-readable medium, such as the storage unit 808. In some embodiments, some or all of the computer program may be loaded and/or installed onto the device 800 via the ROM 802 and/or the communication unit 809. When the computer program is loaded into the RAM 803 and executed by the CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in an order different from that shown in the drawings. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of a dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed herein.

What is claimed is:

1. A method for performing a file system check, comprising:

determining a plurality of unreleased memory pools for a plurality of phases of a file system check by parsing a resource file indicative of an allocation situation of a memory;

determining a list of phases based on the plurality of unreleased memory pools at least in part by determining that an unreleased memory pool exists for each of the plurality of phases, and adding, in response to the unreleased memory pool existing in a corresponding phase, an identifier of the unreleased memory pool to the corresponding phase in the list of phases; and performing the file system check based on the list of phases at least in part by acquiring, prior to performing a corresponding phase of the file system check, an identifier of the unreleased memory pool corresponding to the corresponding phase from the list of phases, allocating memory space for the unreleased memory pool at a start of the memory by prioritizing the creation of the memory pool when the corresponding phase is performed, and performing the corresponding phase of the file system check based on the allocated memory space.

2. The method according to claim 1, wherein determining the plurality of unreleased memory pools for the plurality of phases of the file system check comprises:

determining whether a corresponding phase has a memory fragment based on the resource file; and determining, in response to determining that the corresponding phase has the memory fragment, the plurality of unreleased memory pools causing the memory fragment.

3. The method according to claim 2, wherein determining whether the corresponding phase has the memory fragment comprises:

acquiring from the resource file an identifier indicative of the memory fragment;

determining, in response to the identifier being true, that the memory fragment exists; and determining, in response to the identifier being false, that the memory fragment does not exist.

4. The method according to claim 3, further comprising:

determining a plurality of pieces of information about a plurality of memory pools in the memory based on previous execution processes of the file system check, wherein information in the plurality of pieces of information comprises a phase identifier, a creation timestamp, a release timestamp, and an address space; and generating the resource file based on the plurality of pieces of information.

5. The method according to claim 4, wherein generating the resource file comprises:

determining ranking information for the plurality of memory pools at the corresponding phase based on the address space in the information;

determining the identifier indicative of the memory fragment based on the release timestamp and the ranking information; and generating the resource file based on the plurality of pieces of information and the identifier.

6. The method according to claim 4, further comprising:

updating the release timestamp in response to determining that a memory pool in the plurality of memory pools is released.

7. The method according to claim 1, wherein allocating the memory space for the unreleased memory pool comprises:

acquiring a space size of the unreleased memory pool from the resource file; and allocating the memory space for the unreleased memory pool based on the space size.

8. The method according to claim 1, further comprising:

increasing a count value of an abnormality counter in response to existence of an abnormal behavior causing a memory fragment; and generating warning information in response to the count value being greater than a predetermined threshold.

9. An electronic device, comprising:

a processing unit; and a memory coupled to the processing unit and having instructions stored therein that, when executed by the processing unit, perform the following actions:

determining a plurality of unreleased memory pools for a plurality of phases of a file system check by parsing a resource file indicative of an allocation situation of a memory;

determining a list of phases based on the plurality of unreleased memory pools at least in part by determining that an unreleased memory pool exists for each of the plurality of phases, and adding, in response to the unreleased memory pool existing in a corresponding phase, an identifier of the unreleased memory pool to the corresponding phase in the list of phases; and performing the file system check based on the list of phases at least in part by acquiring, prior to performing a corresponding phase of the file system check, an identifier of the unreleased memory pool corresponding to the corresponding phase from the list of phases, allocating memory space for the unreleased memory pool at a start of the memory by prioritizing the creation of the memory pool when the corresponding phase is performed, and performing the corresponding phase of the file system check based on the allocated memory space.

10. The electronic device according to claim 9, wherein determining the plurality of unreleased memory pools for the plurality of phases of the file system check comprises:

determining whether a corresponding phase has a memory fragment based on the resource file; and determining, in response to determining that the corresponding phase has the memory fragment, the plurality of unreleased memory pools causing the memory fragment.

11. The electronic device according to claim 10, wherein determining whether the corresponding phase has the memory fragment comprises:

acquiring from the resource file an identifier indicative of the memory fragment;

determining, in response to the identifier being true, that the memory fragment exists; and determining, in response to the identifier being false, that the memory fragment does not exist.

12. The electronic device according to claim 11, wherein the actions further comprise:

determining a plurality of pieces of information about a plurality of memory pools in the memory based on previous execution processes of the file system check, wherein information in the plurality of pieces of information comprises a phase identifier, a creation timestamp, a release timestamp, and an address space; and generating the resource file based on the plurality of pieces of information.

13. The electronic device according to claim 12, wherein generating the resource file comprises:

determining ranking information for the plurality of memory pools at the corresponding phase based on the address space in the information;

determining the identifier indicative of the memory fragment based on the release timestamp and the ranking information; and generating the resource file based on the plurality of pieces of information and the identifier.

14. The electronic device according to claim 12, wherein the actions further comprise:

updating the release timestamp in response to determining that a memory pool in the plurality of memory pools is released.

15. The electronic device according to claim 9, wherein allocating the memory space for the unreleased memory pool comprises:

acquiring a space size of the unreleased memory pool from the resource file; and allocating the memory space for the unreleased memory pool based on the space size.

16. A computer program product having a non-transitory computer readable medium which stores a set of instructions to perform a file system check; the set of instructions, when carried out by computerized circuitry, causing the computerized circuitry to perform a method of:

determining a plurality of unreleased memory pools for a plurality of phases of a file system check by parsing a resource file indicative of an allocation situation of a memory;

determining a list of phases based on the plurality of unreleased memory pools at least in part by determining that an unreleased memory pool exists for each of the plurality of phases, and adding, in response to the unreleased memory pool existing in a corresponding phase, an identifier of the unreleased memory pool to the corresponding phase in the list of phases; and performing the file system check based on the list of phases at least in part by acquiring, prior to performing a corresponding phase of the file system check, an identifier of the unreleased memory pool corresponding to the corresponding phase from the list of phases, allocating memory space for the unreleased memory pool at a start of the memory by prioritizing the creation of the memory pool when the corresponding phase is performed, and performing the corresponding phase of the file system check based on the allocated memory space.

* * * * *